US008751558B2

(12) United States Patent
Bleier et al.

(10) Patent No.: US 8,751,558 B2
(45) Date of Patent: Jun. 10, 2014

(54) MASHUP INFRASTRUCTURE WITH LEARNING MECHANISM

(75) Inventors: Orly Bleier, Hod Hasharon (IL); Ram Alon, Ramat Gan (IL); Ran Gross, Rosh-Haain (IL); Ariel Tammam, Ramat Gan (IL); Vitaly Vainer, Ashdod (IL)

(73) Assignee: SAP AG, Walldorf (DE)

( * ) Notice: Subject to any disclaimer, the term of this patent is extended or adjusted under 35 U.S.C. 154(b) by 152 days.

(21) Appl. No.: 12/728,956

(22) Filed: Mar. 22, 2010

(65) Prior Publication Data
US 2011/0231592 A1 Sep. 22, 2011

(51) Int. Cl.
*G06F 15/16* (2006.01)

(52) U.S. Cl.
USPC .......................................................... 709/201

(58) Field of Classification Search
CPC ....... H04L 29/08135; G06F 8/34; G06F 9/54; G06F 9/541; G06F 9/544; G06F 9/546; G06F 8/36; G06F 8/33; G06F 8/43
USPC .......................................................... 709/201
See application file for complete search history.

(56) References Cited

U.S. PATENT DOCUMENTS

| 7,512,690 | B2 | 3/2009 | Gross et al. |
| 7,533,135 | B2 | 5/2009 | Klein et al. |
| 7,584,172 | B2 | 9/2009 | Heuer et al. |
| 7,640,191 | B2 | 12/2009 | Mueller et al. |
| 2006/0165105 | A1* | 7/2006 | Shenfield et al. ............. 370/401 |
| 2007/0300243 | A1 | 12/2007 | Gross et al. |
| 2008/0154950 | A1 | 6/2008 | Gross |
| 2008/0162164 | A1 | 7/2008 | Segler et al. |
| 2008/0162205 | A1 | 7/2008 | Gross |
| 2008/0162207 | A1 | 7/2008 | Gross et al. |
| 2008/0162415 | A1 | 7/2008 | Kaiser et al. |
| 2008/0162563 | A1 | 7/2008 | Gross et al. |
| 2008/0162616 | A1 | 7/2008 | Gross et al. |
| 2008/0162777 | A1 | 7/2008 | Kaiser et al. |
| 2009/0171736 | A1 | 7/2009 | Segler et al. |
| 2009/0204594 | A1* | 8/2009 | Akkiraju et al. ................... 707/5 |
| 2010/0037157 | A1* | 2/2010 | Chang et al. ................... 715/764 |
| 2010/0211580 | A1* | 8/2010 | Sreekanth ..................... 707/756 |
| 2010/0325167 | A1* | 12/2010 | Landry ......................... 707/802 |

FOREIGN PATENT DOCUMENTS

JP       A 2008-021095       1/2008

OTHER PUBLICATIONS

"About the Pipes Editor". Yahoo! Inc. Archived by the Internet Archive on Jun. 18, 2007: <http://web.archive.org/web/20070618165820/http://pipes.yahoo.com/pipes/docs?doc=editor>. pp. 1-2.*

(Continued)

*Primary Examiner* — Christopher Biagini
(74) *Attorney, Agent, or Firm* — Fish & Richardson P.C.

(57) ABSTRACT

The present disclosure involves systems, software, and computer implemented methods for providing a mashup infrastructure with a learning mechanism. One process includes operations for receiving a request for connecting a first port of an application with a different port and identifying tagged parameters associated with the first port. A set of potential ports for connecting with the first port based at least in part on the tagged parameters is dynamically determined. A suggestion of potential ports for connecting with the first port, including at least a subset of potential ports selected from the set of potential ports, is presented.

20 Claims, 5 Drawing Sheets

(56) References Cited

OTHER PUBLICATIONS

"Pipes Overview". Yahoo! Inc. Archived by the Internet Archive on Jun. 8, 2008: <http://web.archive.org/web/20070608021843/http://pipes.yahoo.com/pipes/docs?doc=overview>. p. 1.*

Extended European Search Report issued in European Application No. 11001125.1 on Sep. 30, 2011; 6 pages.

Hoyer et al.; "Market Overview of Enterprise Mashup Tools"; Service-Oriented Computing 2008; Dec. 1, 2008; 14 pages.

Daniel et al.; "Turning Web Applications into Mashup Components: Issues, Models and Solutions"; Web Engineering; vol. 5648; Jun. 24, 2009; 16 pages.

Communication from JP Associate re action received from the Japanese Patent Office for Application No. 2011-29746 mailed Jun. 20, 2013; 5 pages.

Japanese Office Action mailed Mar. 5, 2013, in Appl. No. 2011-29746 filed Feb. 15, 2011; with English translation attachment (3 pages).

* cited by examiner

MASHUP INFRASTRUCTURE WITH LEARNING MECHANISM

TECHNICAL FIELD

The present disclosure relates to software, computer systems, and computer implemented methods for an efficient learning mechanism in a mashup infrastructure.

BACKGROUND

Certain applications can support mashup capabilities, permitting users to combine components of different applications onto one page or workspace. For example, a user may select a particular component of one application and insert the component into a second application. The combined components can be called mashup components because the components are capable of being "mashed up," or collected in a customized arrangement, on a page or workspace. The page typically has a layout used to define the visual order of "mashable" applications or components. Further, data flows can be defined between mashable applications by connecting the input ports or output ports of these applications. In this way, a user of mashup applications can customize a page or workspace with only components that the user needs or desires.

Mashup components are applications that can be combined with other applications or processes to create a new service or to enhance existing applications with additional features. In a typical mashup environment, different applicative elements of the mashup components can be linked, which requires defining a contextual connection between the elements before data or events can be properly exchanged between the mashup components. The mashup components, however, can come from different sources or be implemented using different technologies. In some instances, mashup components developed from different technologies require different interfaces for input or output of data. Thus, defining a connection between elements of mashup components with different interfacing technologies may require development of bridges between the technologies. The different technologies associated with each mashup component may require an interface in a specific domain language, creating difficulties in defining contextual connections between mashup components that provide added value to a mashup environment. Further, users of mashup components may not have the technical knowledge to define or manage connections between mashup components of different interfaces.

SUMMARY

The present disclosure provides techniques for implementing a mashup infrastructure with a learning mechanism. A computer program product is encoded on a tangible storage medium, where the product comprises computer readable instructions for causing one or more processors to perform operations. These operations can include receiving a request for connecting a first port of an application with a different port and identifying tagged parameters associated with the first port. A set of potential ports for connecting with the first port based at least in part on the tagged parameters is dynamically determined. A suggestion of potential ports for connecting with the first port, including at least a subset of potential ports selected from the set of potential ports, is presented. The set of potential ports for connecting with the first port may also be based on a history of connections associated with the first port.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
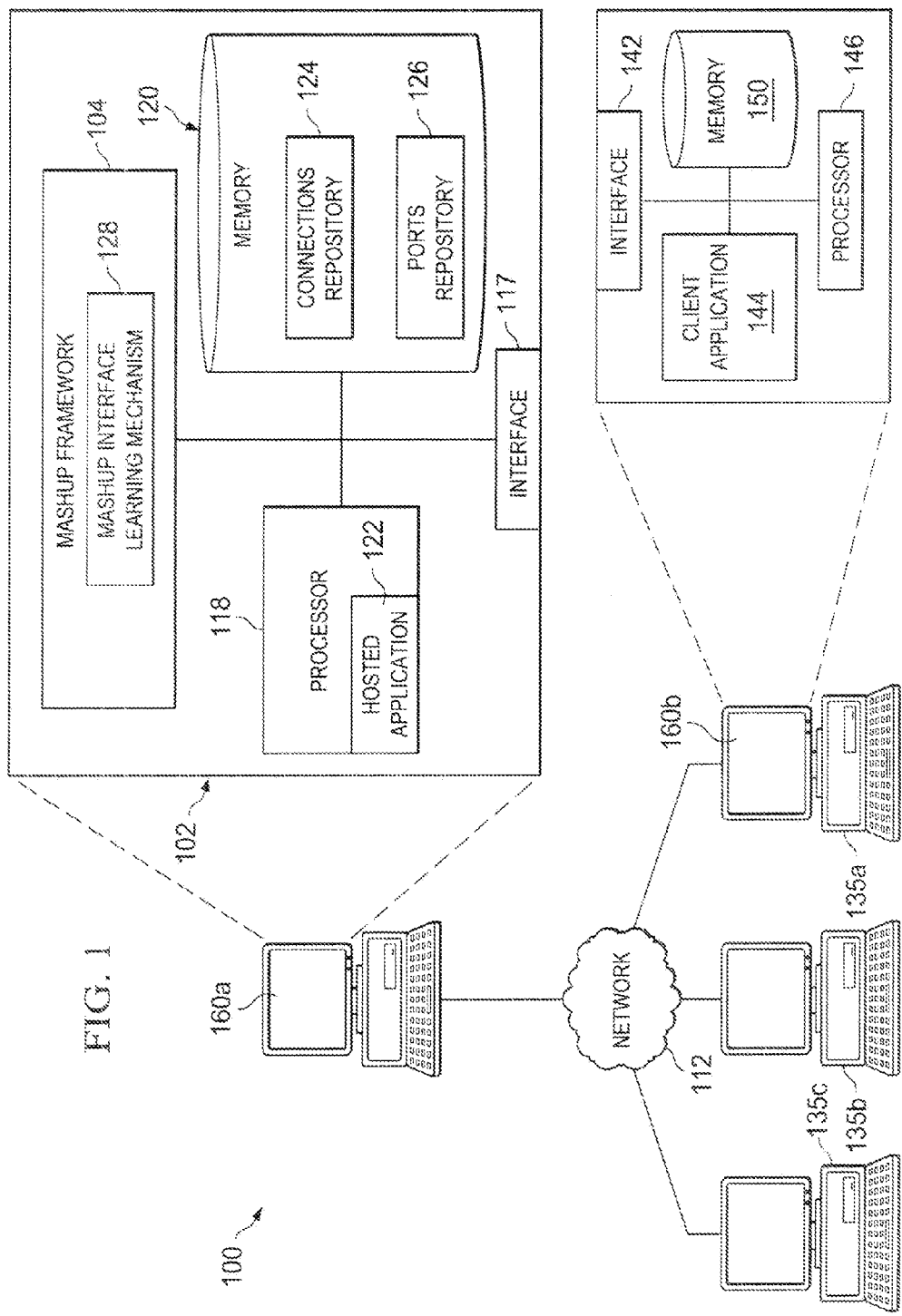
FIG. 1 illustrates an example environment implementing various features of a mashup infrastructure with a learning mechanism within the context of the present disclosure.

This disclosure generally describes computer systems, software, and computer implemented methods for providing an automatic learning mechanism for defining connections between mashup components. In general, a mashup environment may comprise an environment in which applications, modules, or functions called mashup components can be used in connection with other applications in a flexible manner based on a user's customization and arrangement of the applications. A mashup component can be a webpage, application, or part of an application such as a module, component, service, or subroutine that contains data or functionality that can be combined with another application or component, such as another mashup component, based on a user's preferences. Moreover, the term "mashup component," "mashup application," "mashable application," or "mashup entity" may be used interchangeably as appropriate without departing from the scope of this disclosure. Thus, an application designed with mashup functionality can have particular data or functionality within the application combined with other components of the application or with particular components of one or more external applications to create a new service. In some mashup scenarios, a page or workspace can have a layout used to define the visual arrangement of mashable applications in the workspace. Further, the mashable applications can interact with each other, such as by passing content between mashable applications. In particular, a mashable application can be combined with other mashable applications through data flows connecting input and output ports of the applications as defined by the user. In a mashup environment, mashable applications arranged in a particular format can be rearranged in different combinations, resulting in different data flows and connections between elements of the mashup applications. A mashable application can be linked with other applications through ports, such as input or output ports which allow data to be shared among various applications. A user can customize the arrangement of mashup components according to the user's preferences.

In some instances, mashable applications may have different interfaces for creating and configuring connections between ports associated with the mashable applications. The mashable applications may be associated with different technologies or sources, and some interfaces of the mashable applications may be incompatible with each other. While different components of the mashable applications may potentially share a connection, mismatching data formats among various components may make it difficult to create data connections. Moreover, a user may not know which ports can be connected to form a contextual connection between mashable applications or how to create connections between ports associated with different mashable applications. Accordingly, a mashup model and system can be implemented to automatically define connections between mashup application ports or to provide automated suggestions for connecting ports.

Mashup applications can include input and output ports as well as data connections between the ports. The ports of a mashup application are input and output interfaces for linking the mashup application with interfaces of other applications or components, and each port may be associated with a type of data. In certain implementations, a learning system or model can generate suggestions for connecting particular ports and present the suggestions to a user. In particular, certain ports of a mashup application can be defined with parameters and tags, and based on the parameters and tags, one or more suggestions can be generated or provided that present possible connections between two ports. In addition, the learning system can generate suggestions for connecting certain ports based on existing connections between ports or a history of established connections for certain mashable applications. Further, a mashup model can be used to define mashup entities and connections to support the design of mashup scenarios. Mashup elements such as ports and connections can be represented as objects to facilitate connections of mashup applications with each other.

Certain ports of the mashup applications may include parameters that define attributes of the ports. In some implementations, a user can apply tags to the parameters for a particular port to further define the port and provide additional context for later use. The learning system of the present disclosure can suggest possible connections between a source component or port and a target component or port. The suggestion can be based on matching port parameters, tags, or existing connections associated with the port. Learning logics and algorithms utilizing port definitions and connections can also be applied to improve the system's suggestion capabilities and to find more effective connections. Further, the suggestion capability of the learning system can be constantly improved as tags and parameters for mashup application ports are enhanced will more information over time. For example, as a particular port is associated with more connections, the port's history of connections expands, creating a larger store of data from which suggestions can be based. Various algorithms can be used to enrich the tags of a port or to generate suggestions for connections. For example, when a connection is created between two ports, the tags of each port's parameters can be copied to the other port's parameters; creating derived tags in the parameters of each of the two connected ports. In some implementations, the derived tags can be propagated across existing repositories containing port parameters to further expand possible matches. Also, for the two connected ports, the name of the parameter from one port can be added as a tag to the mapped parameter in the other port, creating an internal tag. With the newly added tags based on the connection between the two ports, the two ports have a higher chance for inclusion in a suggestion generated by the learning system for additional connections.

One potential benefit of such techniques is that connections between mashup applications can be facilitated in an efficient manner. Mashup applications may have been developed by different entities using different technologies and interfaces, preventing many users from being able to create or define connections between mashup applications due to the disparate interfaces associated with different components. The learning mechanism of the present disclosure can automatically create connections between ports of mashup applications or provide suggestions to a user for forming those connections. Further, the learning mechanism can use a mashup model that can abstractly define mashup entities and connections and use mashup information from various repositories and other contextual connections. The learning mechanism can also evolve over time, as user-defined tagging and ranking of port attributes and parameters can be fed back into the learning system for future suggestion of connections between mashup applications. In other words, the learning mechanism can adapt to constant updating of port parameters to provide a wider selection of possible connections. Accordingly, the suggestions generated by the learning mechanism can be constantly improved.

Turning to the illustrated example, FIG. 1 illustrates an example environment 100 for a mashup infrastructure with a mashup framework 104 and a learning mechanism 128. The illustrated environment 100 includes or is communicably coupled with server 102 and one or more clients 135, at least some of which communicate across network 112. The environment 100 also supports a system capable of automatically connecting ports of different mashup applications or generating suggestions for connecting different ports.

In general, server 102 is any server that stores one or more hosted applications 122, where at least a portion of the hosted applications 122 is executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by the clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications 144 associated with the clients 135 of environment 100 and responding to the received requests by processing said requests in the associated hosted application 122, and sending the appropriate response from the hosted application 122 back to the requesting client application 144. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, one or more hosted applications 122, and a mashup framework 104. The interface 117 is used by the server 102 for communicating with other systems in a client-server or other distributed environment (including within environment 100) connected to the network 112 (e.g., client 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 102 may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to tag parameters of components or ports of a mashable application. GUI 160a may also display suggestions of possible connections between ports of a mashable application. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CU) that processes information in the platform and efficiently presents the results to the user visually.

Generally, example server 102 may be communicably coupled with a network 112 that facilitates wireless or wireline communications between the components of the environment 100 (i.e., between the server 102 and the clients 135), as well as with any other local or remote computer, such as additional clients, servers, or other devices communicably coupled to network 112 but not illustrated in FIG. 1. The network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated, as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 can also execute a mashup framework 104 for managing the configuration of mashup applications. The mashup framework 104 is a set of interfaces, modules, services and metadata definitions that enable a user to define a mashup scenario that can be executed in a standard portal page. The mashup framework 104 provides the capability to define an application as a mashup entity, or an application that can send or receive a mashup event. In particular, the mashup applications can be implemented on a mashup page, which is a portal page in which the mashup applications are contextually connected to each other. A user can interact with one mashup application, which may trigger the propagation of contextual data between all mashup applications fiat are connected on the mashup page. The mashup framework 104 can define, within the scope of the mashup page, the parameters of the connections between mashup entities. Specifically, the mashup framework 104 can define one mashup application as a source application and another mashup application as a target application, and define the connection between the source and target mashup applications, including the parameters that map the output of the source with the input of the target application. At runtime, the mashup framework 104 can be configured to execute connections between source and target mashup applications, dispatching mashup events and communications between source and target applications in response to user interactions. In other words, mashup framework 104 can provide an environment for creating, managing, and executing mashup applications and interfaces between the mashup applications. The mashup framework 104 may be separate from hosted application 122, while in other instances, the mashup framework 104 may be embedded within or part of a particular one or more hosted applications. In some instances, hosted application 122 may be communicably coupled to the mashup framework 104, allowing hosted application 122 to access and take advantage of the functionality provided by the mashup framework 104. One example of an environment for the mashup framework 104 is described in detail below in connection with FIG. 6.

Processor 118 can also execute mashup interface learning mechanism software 128 provided by or associated with mashup framework 104. The mashup interface learning mechanism software 128 may generally be any application, program, function, module, process, runtime engine, or other software that may execute, change, delete, generate, or otherwise manage information according to the present disclosure, particularly in order to implement a learning mechanism 128 for facilitating data connections between ports of mashup applications, regardless of the differences in interfaces among the mashup applications. Through analysis of previously created connections between mashup application ports, the learning mechanism 128 can identify potential connections that may have a greater chance of successful interfaces between different mashup applications. The functionality provided by the mashup interface learning mechanism 128 can include providing UI support for development of web representations of business applications, for example.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122.

Further, memory 120 may store data associated with input and output ports of mashup applications in a ports repository 126. The data associated with the ports can be user-defined or automatically generated metadata, parameters, tags, or other data describing the interface of various mashup applications used in the mashup interface of the present disclosure. Memory 120 may also store data associated with various connections, either potential connections or previously established connections, between mashup application interfaces in a connections repository 124. The data in the connections repository 124 may include data associated with a history of connections established between mashup application ports, a ranking of priority (or, in some cases, popularity) of the previously established connections, and other relevant data associated with connections between components of mashup applications that may be used by learning mechanism 128 or for identifying potential connections. The data stored in the ports repository 126 and connections repository 124 can be used for automatically creating connections between mashup application components or recommending possible connections to a user. Still further, memory 120 may include any other appropriate data, such as VPN applications, firmware logs and policies, HTML files, data classes or object interfaces, unillustrated software applications or sub-systems, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 112 using a wireline or wireless connection. Further, as illustrated by client 135a, each client 135 includes a processor 145, an interface 142, a graphical user interface (GUI) 160b, a client application 144, and a memory 150. In general, each client 135 comprises an electronic computer device operable to receive, transmit, process, and store any appropriate data associated with the environment 100 of FIG. 1. It will be understood that there may be any number of clients 135 associated with, or external to, environment 100. For example, white illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of the clients 135 through the display, namely, the GUI 160b.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user directly utilizing GUI 160a to tag parameters of mashup application ports or to view suggestions for possible connections between mashup applications. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
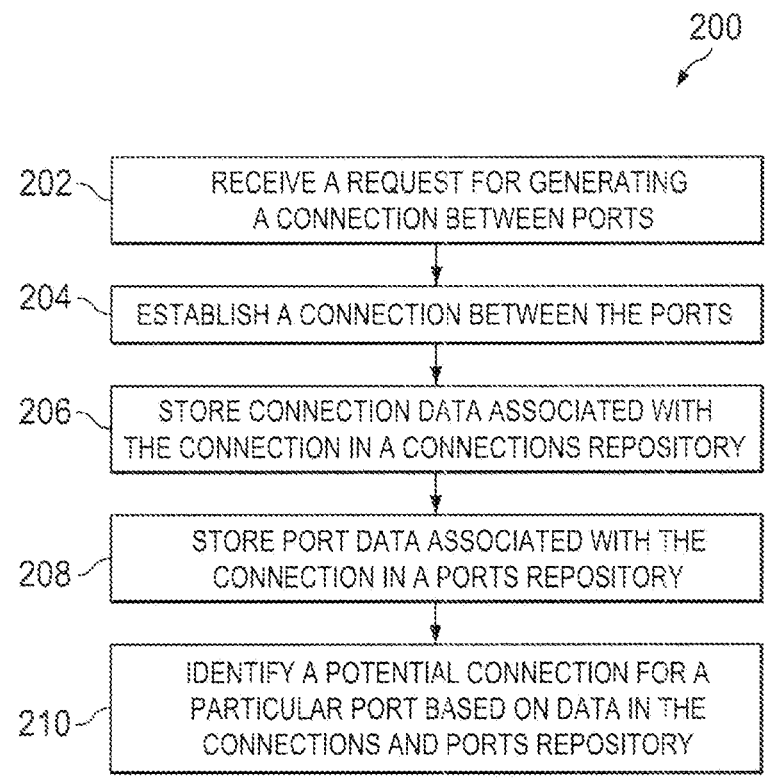
FIG. 2 is a flow chart of an example process of collecting data for identifying potential connections between mashup application ports using an appropriate system, such as the system described in FIG. 1.

FIG. 2 is a flow chart illustrating a process 200 of collecting data for identifying potential connections between mashup application ports. In some implementations, potential connections can be automatically created or suggested to a user based on a history of data collected for different mashup application ports or connections. In other words, potential connections can be identified by leveraging the work of users who have previously established connections between mashup components or who have identified helpful metadata for certain mashup application ports. A particular user's own history can also be utilized to identify potential connections. First, a request for generating a connection between two ports is received at 202. In general, a port can be an interface of a mashup application that comprises parameters and metadata defining a particular component of the mashup applications that can communicate with components of other applications. Thus, data objects or content used by the mashup application cm be passed to other applications. In some instances, a particular port of a mashup application can comprise a source or output port, from which data can be transmitted to an interface of a target or input port of a different mashup application. A link, or a connection, can be established between the source port and the target port that defines the interface (or interaction) between two ports in a particular instance. The connection is defined such that data can be effectively passed from one mashup application to another in one or more instances. In particular, a connection defines how contextual data will be passed from a source component to a target component. The data associated with the connection created between two ports can be stored in a connections repository, such as repository 124 of FIG. 1.

The two ports that are to be connected as requested by the user at 202 may be associated with mashup applications that have either similar or disparate interfaces. If the two ports have disparate interfaces and have different structures, a user with the appropriate technical capability may nonetheless establish a connection between the two ports at 204, for instance, by identifying the differences in format supported by the disparate interfaces and manually programming the logic required for a connection. In some implementations, the connection between the ports may be established automatically such as by the mashup framework 104 and its associated mashup interface learning mechanism 128 illustrated in FIG. 1. Metadata associated with the established connection, whether created manually or automatically, may then be stored in a connections repository 124 at 206. The metadata can include, for example, the names of the ports or associated mashup applications linked by the connection, an identification number for a particular instance of the connection, a description of the types of content that will be transferred across the connection, or other data associated with the connection between the ports. The metadata can be stored in the connections repository 124 automatically or in response to input from a user.

The user may also identify additional attributes of one or both of the two ports and input the attributes as tags or parameters in a port parameters data object or repository (such as ports repository 126) at 208. The metadata for each port can include the types of data supported by the port or mashup application, the parameters for the particular connection established at the port, the structure of the interface of the port, or any other suitable data that may be used to identify the functionality of the port. The ports and connections tags provide information describing the connection created by the user, and may subsequently be used as additional data at 210 to identify a different potential connection for a particular port based on data in the connections and ports repository. One example of a process for identifying potential connections for a port is described in detail below in connection with FIG. 3. Further, process 200 may be repeated for each transaction related to mashup application ports in the system, which expands the history of data connections and collection of data associated with the ports. Accordingly, the data collected from connections previously established either automatically or manually can be leveraged to generate suggestions for new connections between mashup application ports. In some instances, process 200 may end at 208, after data associated with a connection is stored in a ports repository for future access.

Figure 3:
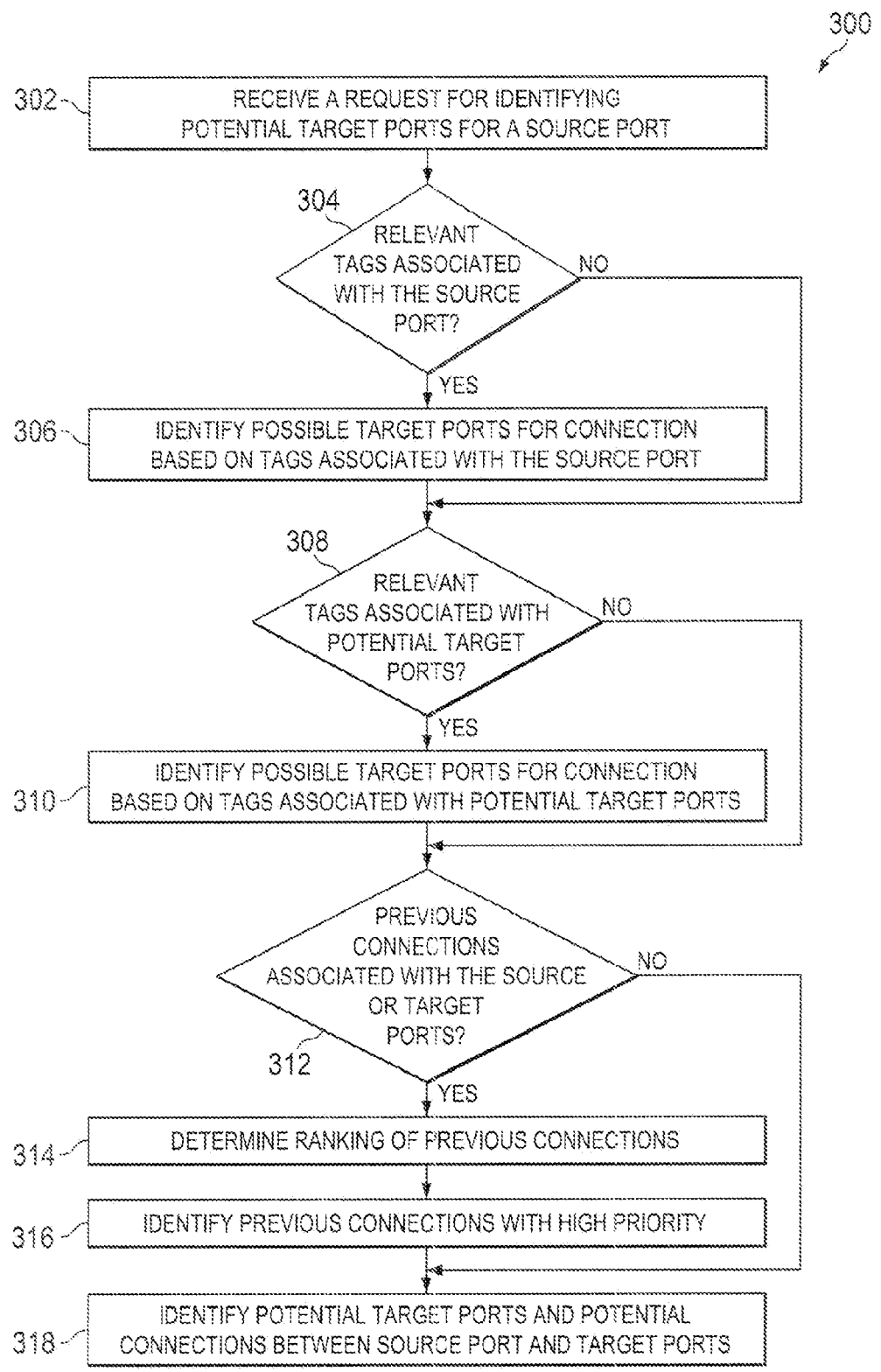
FIG. 3 is a flow chart of an example process of identifying potential target ports or connections that can be established for a particular port using an appropriate system, such as the system described in FIG. 1.

FIG. 3 is a flow chart depicting the process 300 of identifying potential target ports or connections that can be established for a particular port. First, a request for identifying potential target ports for a source port is received at 302. In some implementations, a request can alternatively be received for identifying potential source ports for a particular target port. A request can be received manually from a selection by a user, or automatically in response to various events such as, for example, the addition of new ports of mashup application to the present mashup environment, the propagation of mashup events throughout a mashup framework 104, or addition of tagged parameters to a particular port. Next, process 300 determines whether metadata associated with the source port can be identified. For example, relevant tags associated with the source port may be discovered at 304. The tags associated with the source port can be parameters identified by a user while configuring a previously established connection associated with the source port or with a related port, such as a different port of the same mashup application. The tags can also be parameters automatically copied from other related ports or attributes stored in a repository in response to a previously created connection at the port. In some instances, the mashup framework 104 of FIG. 1 may control or direct the automatic copying of port metadata when one or more connections are made between components. Mashup application ports can include parameters with tags that are enriched, updated, or expanded over time based on various algorithms. For example, derived tags can be created by automatically copying tags of one port's parameters to the parameters of another port when a connection is created between the two ports. Further, when a connection is created between two ports, the name of a particular parameter from one port can be added as a tag to a corresponding mapped parameter of the other port, depending on the context of the connection created.

If relevant tags associated with the source port are not found, process determines whether there are relevant tags associated with potential target ports at 308. If there are relevant tags associated with the source port, a set of possible target ports to be connected with the source port is identified based on the relevant tags associated with the source port at 306. The possible target ports can be identified based on various criteria. For example, target ports that share certain parameters or tags with the source port, or that share a history of previous connections, can be identified as potential target ports. Relevant tags associated with potential target ports can also be identified at 308. For example, a search may be performed for potential target ports with certain matching tags with the source port. If relevant tags associated with potential target ports are found, the set of potential target ports can also be expanded based on tags associated with the potential target ports at 310. If there are no relevant tags associated with potential target ports, process 300 determines whether there are previous connections associated with the source or target ports at 312. Identified target ports can be prioritized based on factors that may increase the chance of a successful connection between a source and target port. One possible factor for prioritizing potential target ports may be the number of previous connections established between the source and target ports.

Further, metadata related to previous connections associated with the source port or potential target ports can be utilized to determine a selection of potential target ports to suggest to a user. First, the process 300 determines whether there are previous connections associated with the source or target ports at 312. If previously established connections exist, it is determined whether some of the connections may be more relevant than others to the identification of target ports for the current source port. In other words, a previously created connection between a source port and a target port may have more or less relevance to the current determination of potential target ports than previously created connections between the source port and other target port. For example, a connection between two ports may have been previously established, but the added value of the connection between those ports may have been minimal in a particular mashup environment. Accordingly, that particular connection may not be as useful when determining potential connecting ports for either of the two ports from the previous connection. Still further, particular connections that are considered useful in one scenario may not provide relevant information for identifying potential target ports in a different scenario, depending on the data types and content of the ports under consideration. Various algorithms may be used to determine the utility of particular connections. For example, the mashup framework 104 may include a suggestion engine that applies a weighting formula to various factors associated with each connection. Some factors for determining the utility of a potential connection may include the frequency of previous instances of a certain connection, whether previous connections of a particular combination occurred relatively recently, the need of a user for connections of a certain type in a particular context, the applicability of certain data types, general preferences of one data format over another, or the number of shared or related tags and parameters. These factors may be assigned different weights to reflect the utility of certain attributes of the connections in different scenarios.

Moreover, a list of previous connections may be stored in a connections repository (e.g., connections repository 126 of FIG. 1) that provides a ranking (or metadata capable of being used to derive a ranking) of the connections in terms of relevance to the source port. Alternatively, process 300 may dynamically determine a ranking of the previous connections at 314 based on a set of criteria. In particular, the learning mechanism 128 of the present disclosure may identify a set of potential connections for the source port based on various possible criteria. For example, previous connections can be ranked based on frequency of use or the number of times a connection was previously made. The ranking may reflect the popularity of a connection between particular ports, which may provide an indication of the usefulness or ease of making the particular connection. In certain implementations, identifying relevant connections can be a product of ranking parameter tags associated with the ports instead of or in addition to ranking connections. For example, a tag that was created automatically may be given a lower ranking than a tag that was created manually. This ranking method may reflect the importance and influence of users who understand the dynamics and/or syntax of a particular connection and who manually enter metadata associated with the port or connection. The ranking of connections or tags can also be based on user feedback provided by downstream users, such as those who had previously received similar suggestions, and their rankings of the relevance or appropriateness of the suggestions in their relative contexts. Still further, the ranking of connections or tags for priority may be dynamically updated as more users create connections between mashup application ports. Based on the ranking of connections or tags, the priority of previous connections can be identified at 316.

At 318, a subset of potential target ports or potential connections can be selected from the identified set of potential target ports and connections for presentation to a user. In some implementations, the subset of potential target ports or potential connections comprises the matching ports or connections for a particular source port that are most likely to yield a compatible and useful target port for connection. The selection of matching ports and connections can be based on a combination of factors such as the metadata (tags) associated with potential ports and connections, the history of previous connections between potential ports, rankings of previous connections, or other metrics that define qualities deemed to be beneficial to users of particular mashup applications. The metadata may be constantly updated by learning mechanism 128 as more connections are created over time.

In addition to the tagged parameters described above, the metadata associated with a particular port may include other elements. For instance, mashup applications that originate from different sources may be comprised of ports that have interface parameters of mismatching formats. If a mashup application outputs data in a format unrecognized by or incompatible with the receiving application, a direct connection between the applications cannot be created. In certain implementations, a bridge or function can be used to convert data between formats, such as from a format associated with an output port to a format associated with an input port, in order to create a valid connection between two ports with different formats. The functionality of a bridge for converting data from one format to another can be included in the parameters or definition of a connection between two particular ports. In other words, the definition of a connection between ports may include the underlying technology for converting data flowing from the source port to the target port.

Figure 4:
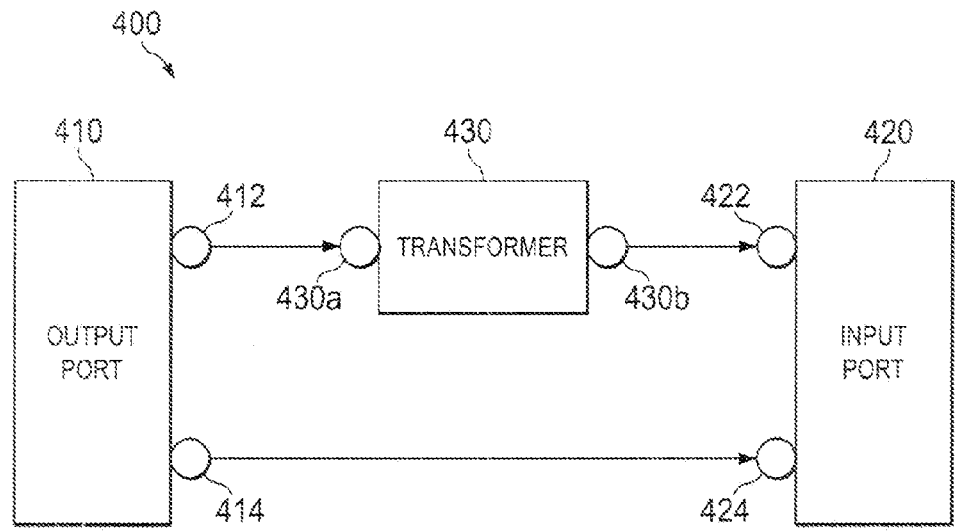
FIG. 4 is an example mashup model of a connection between two ports within an appropriate system, such as the system described in FIG. 1.

FIG. 4 depicts a model of a connection between two ports that requires configuration of the parameters of the ports such that they are able to communicate with each other. As seen in FIG. 4, output port 410 may be a source port associated with a mashup application and configured to form a connection with an input port 420 of a target mashup application. The output port 410 can include one or more interface parameters such as parameters 412 and 414. The interface parameters 412 and 414 may be mapped to corresponding interface parameters 422 and 424 of input port 420. That is, data flows may be defined to transfer content used by a mashup application associated with output port 410 to a mashup application associated with input port 420 through the interface parameters depicted in FIG. 4.

In some instances, however, interface parameters that are mapped to each other, such as parameters 412 and 422, may comprise mismatching or noncompatible formats, which may complicate the transfer of data from source to target. For example, a data report may be transmitted from one mashup application to another through a connection between two ports of the mashup applications. While both the source and target mashup applications may be configured to handle data reports, the source mashup application may generate data reports with identification numbers using six digits while the target mashup application may be configured to process data reports with identification numbers using eight digits. The target application may be able to receive the identification numbers with six digits through the interface parameters of the target application, but the target application may require an additional two digits in the received identification number to process the number according to the eight-digit configuration required by the target application business logic. Accordingly, the identification number that is sent from the source application to the target application may need to be converted such that additional digits are added to the number to comply with the requirements of the target application parameters.

As represented in the model in FIG. 4, a transformer element 430 can be defined as an intervening component for data flows between the output interface parameter 412 and input interface parameter 422. The transformer element 430 is a data manipulation entity that can be applied on a port parameter to conform outgoing or incoming data to a particular format as required by a connected port. In the illustrated example, data from an output port 410 is received at an input transformer interface parameter 430a, and the data is converted to an appropriate format to be received by input port 420 after the data is transmitted from output transformer interface parameter 430b to interface parameter 422. The transformer element 430 can be added to a connection by a user such as at design time in a mashup model environment using any appropriate method such as via a drag-and-drop or context menu mechanism. The transformer element 430 can also be automatically included by business logic of a mashup framework. In some implementations, a mashup framework may provide suggestions of possible connections to a user, and the suggestions may include the logic for the transformer element 430 to properly complete the connection. The transformer element 430 may not be included in some connections that do not require conversion of data formats, such as the connection between interface parameters 414 and 424.

Figure 5:
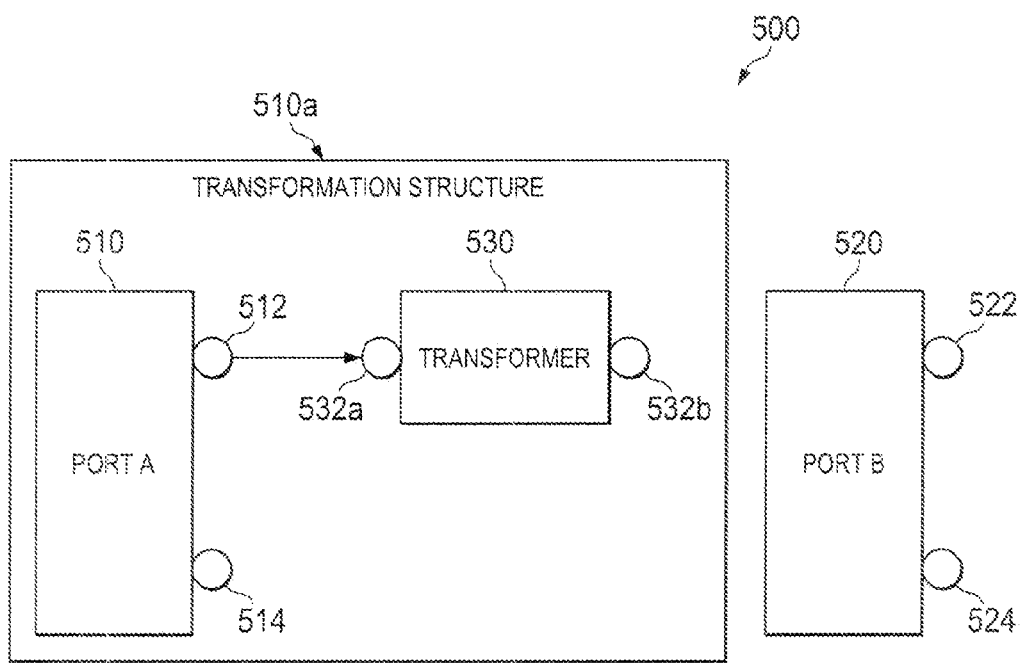
FIG. 5 is an example mashup model of an instance of a port with a transformer element within an appropriate system, such as the system described in FIG. 1.

The transformer element 430 can further be defined as a parameter of a mashup application port. From an external perspective, as depicted in FIG. 5, the inclusion of a transformer element 430 in the parameters of a port may be viewed as a new instance of the port, and a user may directly access a mashup component with a port that includes a transformer without the need to program additional logic for converting data into an appropriate format. In the illustrated example, a transformation structure 510a may represent a module that includes elements associated with a particular port 510. Included in the transformation structure 510a are the base parameters of the port 512 and 514, as well as a transformer element 530. The transformer element 530 can be configured to receive data in a particular format at 532b and convert the data into a format compatible with base parameter 512. The transformer element 530 can include a transformer out-parameter 532a that directs a data flow for the converted data into base parameter 512. An external port 520 associated with a different application and interface may be connected to the base port 510 through the mapped parameters associated with the ports. In some implementations, interface parameter 522 of port 520 can connect directly to the port instance represented in transformation structure 510a because the software logic associated with transformer element 530 is represented as part of the base port 510 and not as a separate component. The port instance is exposed as a conventional or duplicate port, and interface parameter 522 may be mapped to transformer in-parameter 532b as a connection between ports 510 and 520.

Figure 6:
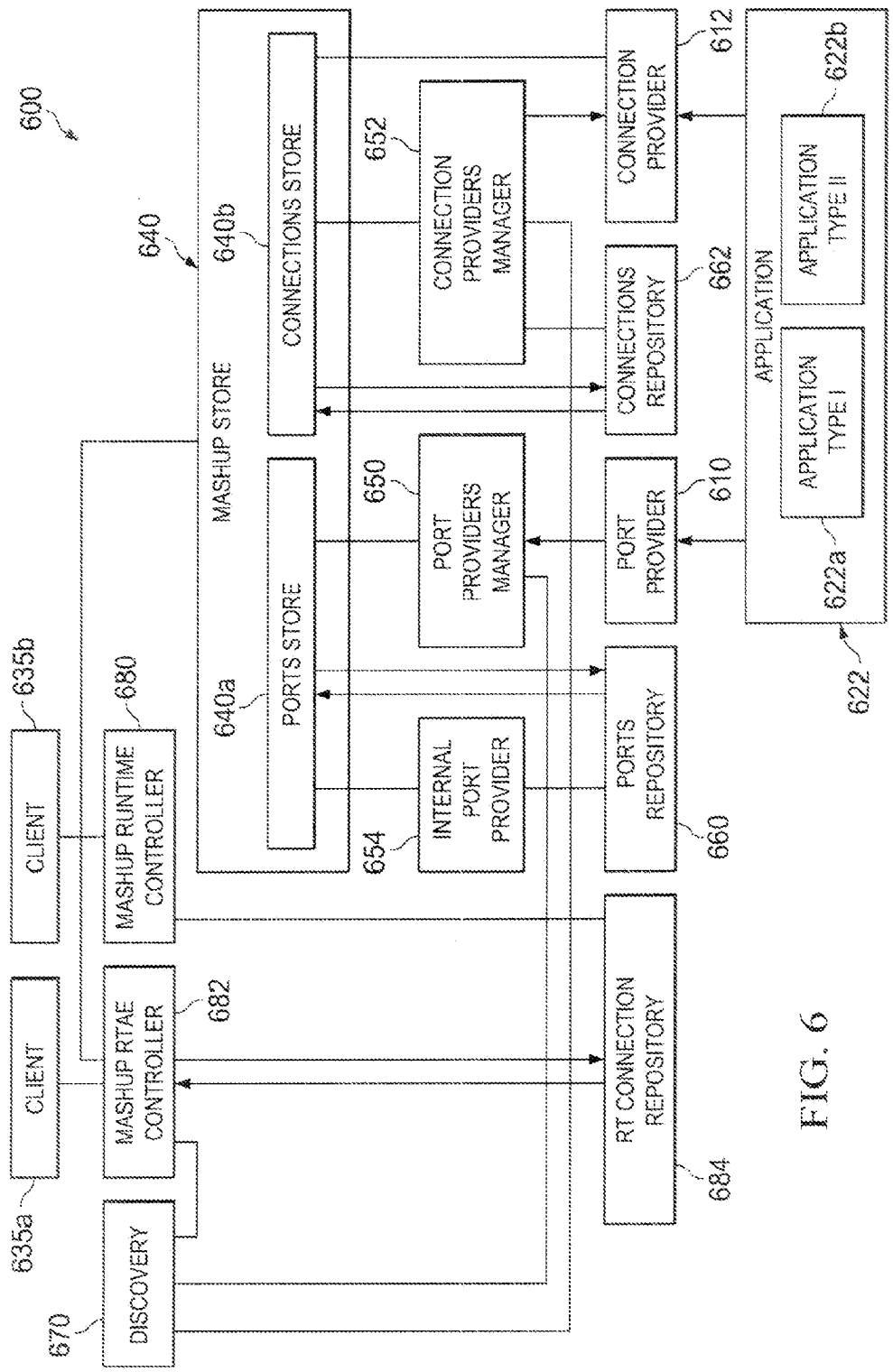
FIG. 6 is a diagram of an example implementation of a mashup framework used within an appropriate system, such as the system described in FIG. 1.

The mashup framework 104 can provide a design time environment for managing the exposure of mashup application ports to users and presenting an appropriate interface to users for working with mashup applications. The functionality of the mashup framework 104 can be achieved using various implementations, and an example of a mashup environment provided by mashup framework 104 is depicted in FIG. 6. In general, the mashup framework 104 as illustrated in FIG. 6 is a set of extendable services that provide the ability to define and persist connections and ports between components of applications, and discover possible matching connections between ports and over existing connections. The mashup framework 104 can also include a runtime processor for processing the defined connections and transferring output mashup events to appropriate mashup input events. Here, a runtime processor can be a runtime service that manages the propagation of events sent by sources such as the components of mashup applications. The runtime processor can locate target application components that are to be connected to source application components and build the appropriate target events during execution of the mashup connections.

Turning to the illustrated example, FIG. 6 illustrates an example environment 600 for mashup framework 104. The illustrated environment 600 includes or is communicably coupled with one or more clients 635. The clients 635 may access the components of the mashup framework 104 depicted in FIG. 6 remotely through a server as a hosted service or locally at the server. Specifically, mashup framework 104 may be represented as particular user interface elements to a client 635b. The design time elements of the user interface presented to the user may include a mashup store 640 that provides a ports store 640a and a connections store 640b. Specifically, the mashup store 640 can be an interface that serves as the central access point to expose design time services of the mashup framework 104. The mashup store 640, ports store 640a, and connections store 640b are modules provided to or accessible by a client and can be implemented as application programming interfaces (APIs) for exposing the logic of the system underlying the mashup framework 104. In particular, the mashup store 640 components provide accessible services to a user via a user interlace so that the user can obtain information concerning available mashup application ports and connections and generally access the logic and functionality provided by mashup framework 104. For example, the mashup store APIs may allow a user to retrieve a list of possible connections for a specific port, identify or search for exposed ports, modify a port, write data to parameters of a port, obtain information associated with particular ports or connections, or utilize other tools or services provided by mashup framework 104 for managing a mashup environment.

The client 635 may also access or generally use applications 622, such as mashup applications, through the mashup framework 104. The applications may be hosted applications executed on a hack-end server or on the same server that stores the mashup framework 104. The applications 622 may consist of different application types 622a and 622b, and client 635 may use the mashup framework 104 to create or modify connections between applications of different types using logic provided by the mashup framework 104, such as via a transformer element 430 as described above in connection with FIG. 4, for example.

The mashup framework 104 can also provide a mechanism for presenting the various applications 622 and their components to client 635 as accessible ports for identifying and creating connections between mashup applications. In particular, a port provider 610 identifies and exposes components associated with applications 622 to the client 635 or other components of the system. Moreover, when new content in a repository, such as additional updated parameters or connections associated with certain ports, is introduced to mashup framework 104, the port provider 610 can expose the new content as a set of ports available to a client 635. Similarly, a connection provider 612 exposes and makes available any information associated with created connections within the mashup framework 104. The port provider 610 and connection provider 612 can be implemented as service provider interfaces (SPIs) that can be implemented by content repositories in mashup framework 104 to expose ports or connections to other elements of mashup framework 104, including client 635. As the ports and connections of applications 622 are modified through the mashup framework 104, the changes may be saved in ports repository 660 or connections repository 662, which are services configured to expose and maintain the persistency of the ports and connections within mashup framework 104.

Further, the port provider 610 and connection provider 612 modules may be coupled with a port provider manager 650 and a connection provider manager 652, respectively. The port provider manager 650 and connection provider manager 652 may be components of mashup framework 104 that are independent of a particular system or application and manage the port provider 610 and connection provider 612 as ports and connections are exposed to the mashup store 640 for use by client 635. Still further, mashup framework 104 can include an internal implementation of the port provider 654, which may be a readable and writable port provider responsible for managing the local representation of ports. Thus, internal port provider 654 may manage additional configuration data associated with a particular port beyond any parameters declared by a mashup component through port provider 650. For example, internal port provider 654 can track additional metadata associated with a port such as new instances of a port, transformer elements used in an instance of a port, the creation of additional tags in the parameters of a port, or other data defined separately from the initial declaration of the port through port provider 650.

The mashup framework 104 can also provide a discovery or suggestion engine 670, which contains the logic for the learning mechanism described in the present disclosure. In general, discovery engine 670 applies various algorithms for determining appropriate ports and connections to suggest to client 635. The algorithms may be based on a history of connections between certain ports created by users or created automatically through the learning mechanism of mashup framework 104. The suggested ports and connections may also be determined based on tagged parameters associated with the ports or connections, or on other metadata associated with the mashup components. Finally, various components, such as mashup runtime controller 680, a mashup runtime authoring environment controller 682, or a runtime connection repository 684, may be incorporated into the mashup environment as necessary to execute, at runtime, the arrangement of mashup applications and connections between ports created using mashup framework 104. In general, the runtime components are application specific and can consist of Java script or client-side logic that processes mashup connections, trigger the data flows associated with the connections, and provide rendering for the runtime user interface.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, comprising:
receiving a request to identify a set of potential ports to connect to a first port;
storing metadata containing attribute tags and connection data;
identifying the set of potential ports, the identification of the set of potential ports based upon the stored metadata and including:
determining whether metadata attribute tags are associated with the first port;
determining whether metadata attribute tags are associated with at least one potential port of the set of potential ports;
determining that the connection data identifies at least one previous connection is associated with at least one of the first port or the at least one potential port; and
performing a relevance ranking of the determined at least one previous connection to the determination of the set of potential ports using a weighting algorithm applied against at least one relevance factor, each relevance factor associated with at least one weight value reflecting a utility of connection attributes for different connection scenarios; and
presenting a suggestion of potential ports to connect to the first port, the suggestion including at least a subset of potential ports selected from the identified set of potential ports.

2. The computer-implemented method of claim 1, wherein the subset of potential ports is selected based at least in part on a history of related connections associated with the first port or potential ports in the subset of potential ports.

3. The computer-implemented method of claim 1, wherein the subset of potential ports is selected based at least in part on criteria including at least a degree of compatibility between the first port and each of the ports in the set of potential ports.

4. The computer-implemented method of claim 3, wherein the degree of compatibility is based at least on one of a data type of the data processed by the first port and the potential ports or a format of the data processed by the first port and the potential ports.

5. The computer-implemented method of claim 1, wherein the first port is configured to process data in a particular format.

6. The computer-implemented method of claim 5, wherein the first port includes a transformer element configured to convert data in a format disparate from the particular format into the particular format.

7. The computer-implemented method of claim 5, wherein the first port includes a transformer element configured to convert data in the particular format into data in a disparate format.

8. The computer-implemented method of claim 1, wherein the suggestion of potential ports includes a suggestion of a transformer element to be used in connection with a potential port.

9. The computer-implemented method of claim 1, further comprising automatically forming a connection between the first port and one of the ports in the subset of potential ports.

10. The method of claim 1, further comprising identifying, among the ranked at least one previous connection, at least one high-priority connection.

11. A computer-accessible, non-transitory, storage medium encoded with computer-readable instructions configured to cause one or more processors to:
receive a request to identify a set of potential ports to connect to a first port;
store metadata containing attribute tags and connection data;
identify the set of potential ports, the identification of the set of potential ports based upon the stored metadata and including:
determining whether metadata attribute tags are associated with the first port;
determining whether metadata attribute tags are associated with at least one potential port of the set of potential ports;
determining that the connection data identifies at least one previous connection associated with at least one of the first port or the at least one potential port; and
performing a relevance ranking of the determined at least one previous connection to the determination of the set of potential ports using a weighting algorithm applied against at least one relevance factor, each relevance factor associated with at least one weight value reflecting a utility of connection attributes for different connection scenarios; and
present a suggestion of potential ports to connect to the first port, the suggestion including at least a subset of potential ports selected from the identified set of potential ports.

12. The medium of claim 11, wherein the subset of potential ports is selected based at least in part on a history of related connections associated with the first port or potential ports in the subset of potential ports.

13. The medium of claim 11, wherein the subset of potential ports is selected based at least in part on criteria including at least a degree of compatibility between the first port and each of the ports in the set of potential ports.

14. The medium of claim 13, wherein the degree of compatibility is based at least on one of a data type of the data processed by the first port and the potential ports or a format of the data processed by the first port and the potential ports.

15. The medium of claim 11, wherein the first port is configured to process data in a particular format.

16. The medium of claim 15, wherein the first port includes a transformer element configured to convert data in a format disparate from the particular format into the particular format.

17. The medium of claim 15, wherein the first port includes a transformer element configured to convert data in the particular format into data in a disparate format.

18. The medium of claim 11, wherein the suggestion of potential ports includes a suggestion of a transformer element to be used in connection with a potential port.

19. The medium of claim 11, further comprising automatically forming a connection between the first port and one of the ports in the subset of potential ports.

20. A system, comprising:

memory operable to store metadata; and at least one hardware processor interoperably coupled to the memory and configured to:

receive a request to identify a set of potential ports to connect to a first port;

store metadata containing attribute tags and connection data;

identify the set of potential ports, the identification of the set of potential ports based upon the stored metadata and including:

determining whether metadata attribute tags are associated with the first port;

determining whether metadata attribute tags are associated with at least one potential port of the set of potential ports;

determining that the connection data identifies at least one previous connection associated with at least one of the first port or the at least one potential port; and performing a relevance ranking of the determined at least one previous connection to the determination of the set of potential ports using a weighting algorithm applied against at least one relevance factor, each relevance factor associated with at least one weight value reflecting a utility of connection attributes for different connection scenarios; and present a suggestion of potential ports to connect to the first port, the suggestion including at least a subset of potential ports selected from the identified set of potential ports.

\* \* \* \* \*